Aug. 19, 1969  C. C. THOR  3,462,172
POWER DRAW BAR HITCH
Filed June 1, 1967
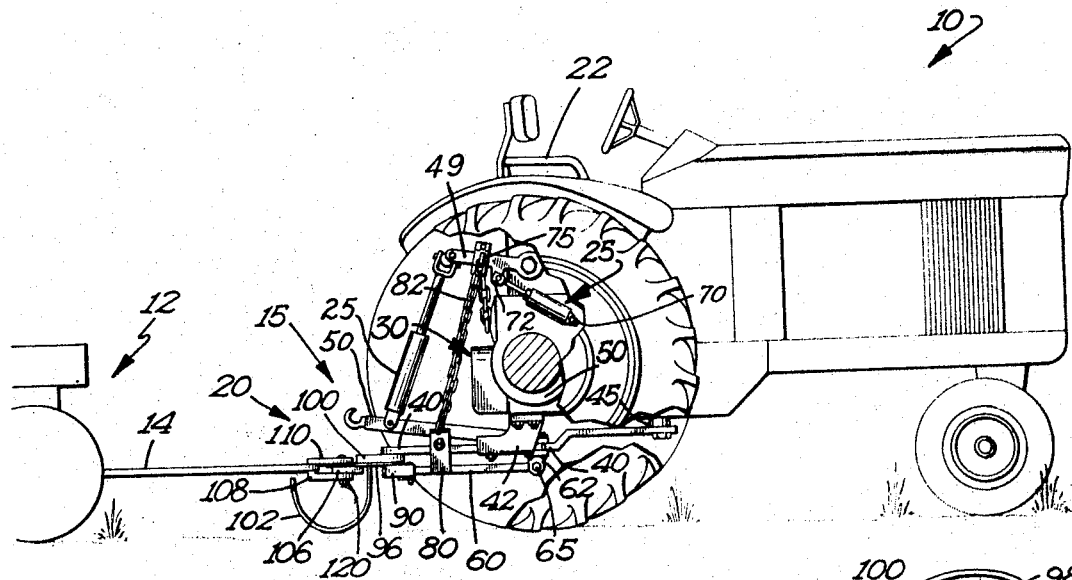
FIG 1
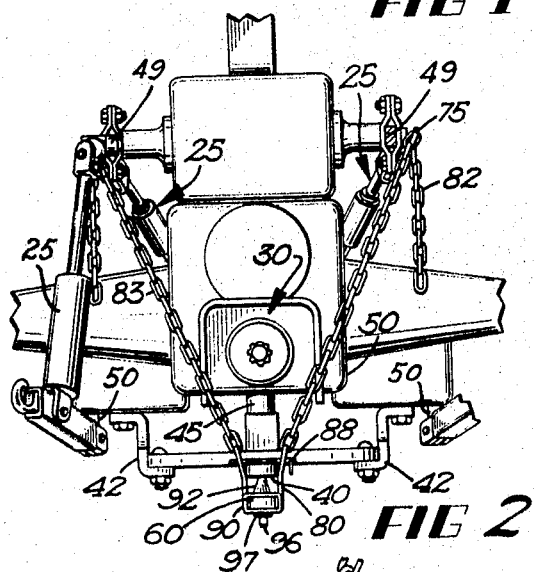
FIG 2
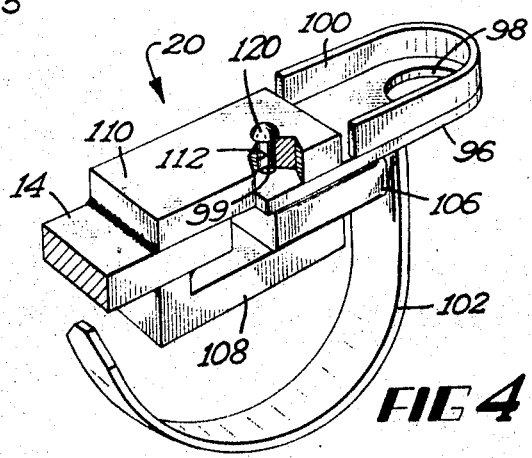
FIG 4
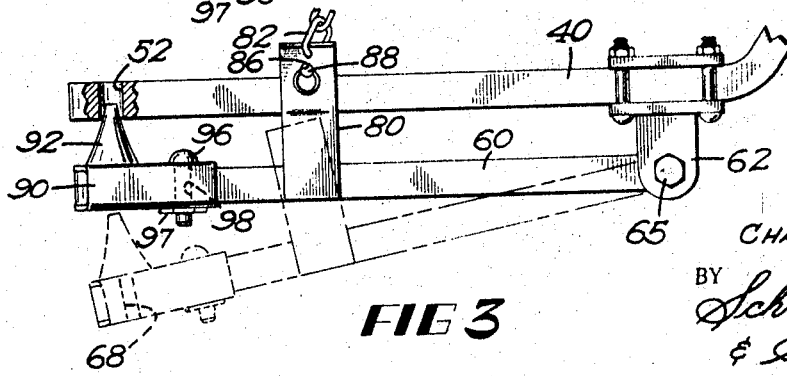
FIG 3
FIG 5
INVENTOR.
CHARLES C. THOR
BY Schroeder, Siegfried
& Ryan ATTORNEYS

United States Patent Office 3,462,172
Patented Aug. 19, 1969

3,462,172
POWER DRAW BAR HITCH
Charles C. Thor, 65 10th Ave. N.E.,
Hutchinson, Minn. 55350
Filed June 1, 1967, Ser. No. 642,924
Int. Cl. B60d 1/02, 7/00
U.S. Cl. 280—479                         6 Claims

ABSTRACT OF THE DISCLOSURE

This power draw bar hitch to be used to connect tractors to a variety of implements, is characterized by the addition of a second pivoted lever or draw bar member pivotally mounted on the conventional draw bar member of a tractor which mounts a conically shaped pin at the extremity of the same adapted to fit through an aperture in a coupling member attached to the tongues of a variety of types of implements. Implements to be used with this hitch will mount a coupling member which includes a curved plate adapted to hold the tongue off of the ground and in a position to receive the conically shaped pin on the second draw bar member as it is elevated toward the first in a coupling operation. The conical shaped pin in addition to fitting through the aperture in the coupling member rests in an aperture in the draw bar member of the tractor to positively lock the coupling for draft purposes.

---

My invention relates to hitches for coupling power draft devices such as tractors with implements to be drawn thereby and more particularly to an improved power draw bar hitch.

Hitches of this general type are known and in use. They provide a quick means for coupling and decoupling a tractor to an implement by means of which the operator of the tractor does not have to remove himself therefrom to effect the coupling. Such prior hitches, however, are extremely complex in structure and require that the implement be especially designed to include a particular type of coupling tongue to co-operate with the coupling element on the tractor. Further, they require a hand operated jack to raise the tongues of most heavy tongued implements. Such an arrangement is expensive, limited in application and permits use only with implements specifically designed for such a coupling or hitch. Further, they generally require accuracy in locating the tractor relative to the implement to effect such a coupling. Generally, such structures include a set of coupling arms or a bifurcated type coupling with a similar structure on the implement. This will not permit use of the particular hitch with any implement other than that for which it is specifically designed.

The present quick power draw bar hitch is directed to an improved structure adaptable for use on all types of implements with a minimum of structural modification and addition. This improved power draft hitch is adapted to be used on tractor implements having separate actuators for hitch couplings, such as in tractors in which quick disconnect couplings of the prior art type are incorporated. It will not interfere with the use of the regular draw bar or other hitches and provide a safe way to hitch and rehitch implements of all types. The specific purpose of the invention is to supplement such a hitch coupling with an improvement which will facilitate use of the same with any type of implement through the simple addition of a separate pivoted draw bar member with a pin coupling member at the extremity of the same and a connection between the pivoted draw bar member and the actuators for operating the hitch coupling. This addition together with a coupling member to be added to the tongue of a standard implement and similar units for all implements to be connected to the tractor will provide a power draw bar hitch which may be used with any implement and which will facilitate rapid connection and disconnection without requiring the operator to dismount from the tractor. It further will permit use of the same without requiring extreme accuracy in locating the tractor relative to the implement tongue and will insure a positive draft connection with a safe locking unit which will apply full draft force and minimize gravity load on the tractor in a safe and efficient manner. A portion of the coupling attached to the implements elevates the implement tongues so that they may be readily coupled to the tractor eliminating the high demands of accuracy on the part of the tractor operator.

Therefore, it is the principal object of this invention to provide an improved power draw bar hitch.

Another object of this invention is to provide a hitch of this type which may be applied readily to all types of implements with a very simplified structural addition.

A still further object of this invention is to provide in an improved power draw bar hitch a simplified structure which eliminates the high demands on driver's skill in the operation of the tractor for coupling and decoupling.

A still further object of this invention is to provide an improved power draw bar hitch which permits a safe locking of the implement in the coupling eliminating the requirement of additional latching and one which will apply draft force in an efficient manner.

A still further object of this invention is to provide in a structure of this type a simplified arrangement of parts which is economical to install and maintain.

These and other objects of this invention will become apparent from a reading of the attached description together with the drawings wherein:

FIGURE 1 is a side elevation view of a tractor employing the improved power draw bar hitch;

FIGURE 2 is a rear elevation view of a portion of a tractor with parts broken away showing the structure of the improved power draw bar hitch;

FIGURE 3 is a side elevation view of a portion of the power draw bar hitch in operative positions;

FIGURE 4 is a perspective view of a coupling member for the improved power draw bar hitch; and FIGURE 5 is a perspective view of an end cap for mounting the coupling pin for the improved power draw bar hitch.

My improved power draw bar hitch is shown in FIGURE 1 in connection with a draft implement, such as a tractor 10, to which it is normally applied. Also shown schematically in FIGURE 1 is a portion of an implement 12, such as a wagon, having a draw tongue 14 by means of which the implement or wagon is coupled to the tractor for draft purposes. The draw bar hitch is shown generally at 15 and it includes a coupling member 20 attached to the tongue 14 of the implement and a coupling structure, to be hereinafter identified, connected to and operated from the tractor. This improved power draw bar hitch is designed to enable the operator of a tractor, while seated on the seat 22 of the tractor, to operate suitable control levers and position the tractor in proximity with the implement for the purpose of coupling the tractor thereto. The improved power draw bar hitch includes power actuator means for pivoting a portion of the hitch such as to connect to the coupling member 20 on the implement tongue without requiring extreme accuracy in positioning the tractor relative to the implement or without requiring the tractor operator to remove himself from the seat to effect such coupling.

Present day draft equipment, such as tractors, are normally supplied or equipped with one or more hitch couplings and suitable auxiliary power equipment to operate the same together with power take-off equipment for operating suitable apparatus on implements to be driven thereby. Thus, as shown schematically in FIGURE 1, the tractor will normally be supplied with one or more auxiliary hydraulic actuators 25 which may take varying forms and locations. Further, the tractor will usually have a power take-off section, indicated at 30, which is geared to the drive structure of the tractor and will provide a power source to be coupled to implements, where required. In addition, the tractor will be supplied with a conventional draw bar member 40 which is pivotally mounted on a yoke type structure 42 attached through suitable means such as brackets 45 to the frame or axle housing of the tractor 50. The draw bar member 40 will normally be slidably mounted on the yoke structure 42 for pivotal movement in a horizontal plane such that when an implement is coupled thereto the draw bar member may pivot to provide proper trailing of the implement behind the same. This draw bar member will project a given distance beyond the power take-off section 30 and will normally be provided with an aperture 52 in the extremity of the same.

In addition, present day tractors may be provided with specialized hitch couplings having a plurality of pivoted arms 49, 50 with which the hydraulic actuators 25 may be associated as shown in FIGURE 1. Such couplings, where provided on a tractor, are limited in application in that they require a specialized implement whose draft tongue will remain elevated and will have a bifurcated structure or dual tongue structure to couple thereto.

The present improved power draw bar hitch utilizes the standard draw bar member 40 on the tractor and includes a second pivoted draw bar member 60 which is pivotally mounted on the first draw bar member 40 intermediate its extent through a platelike flange bracket section 62 bolted to the draw bar 40 and having a pivot structure 65 to mount the draw bar member 60 thereon. With this mounting of the second draw bar member 60 on the first draw bar member, the second will move with the first draw bar member 40 for pivotal movement on the horizontal plane. The pivoted draw bar member 60 is pivoted in a plane normal thereto such as to move vertically with respect to the draw bar member 40 and be aligned therewith. It is of approximately the same length so that the extremities of the two draw bar members align and the draw bar member 60 has an aperture 68 therein which in a raised and parallel position with a draw bar member 40 will align with the aperture 52 in the extremity of the same. The hydraulic actuators 25 for the hitch coupling ar pivotally mounted on portions of the frame as at 70 and the shaft extremity 72 of the actuators connects to pivoted arms 49 on the tractor. The arms 49 include suitable hook portions 75 to which chain lengths may be attached. The draw bar member 60 includes a yoke or U shaped flange section 80 attached thereto which projects above the upper surface of the draw bar member 40 in an elevated position of the draw bar member 60 and permits connection of the pair of chains 82, 83 to the hook portions 75 located on the arms 49 connected to the actuators 25. Further, the flange sections 80 which have suitable apertures 86 therein which in the raised position of the draw bar member 60 with respect to the draw bar member 40 will be positioned above the upper surface of the draw bar member 40 so that a suitable pin such as 88 may be inserted therethrough to hold the draw bar members 40 and 60 in a spaced parallel relationship. A separate U-shaped flange (not shown) may be provided for this purpose.

The pivoted draw bar member 60 mounts an end cap 90 which is sleeve-shaped and carries a conically shaped pin 92 thereon which is tapered to a dimension at its upper extremity smaller than the aperture 52 in the draw bar member 40. This sleeve member 90 includes an aperture 95 therein by means of which a suitable bolt 96 and nut 97 combination may connect the sleeve member 90 through a second aperture 98 in the draw bar member 60 to secure the end cap thereon. In the secured position, the axial center of the cylindrical pin 92 aligns with the aperture 52 when the draw bar member 60 is in a raised and elevated position parallel to the draw bar member 40. Thus, as shown in FIGURE 3, the draw bar member 60 is shown in phantom in a lowered position and solid in a raised position to describe this relationship. The height of the pin 92 is slightly greater than the spacing between the draw bar members so that in the raised position the small extremity of the conically shaped pin will project into the aperture 52 in the draw bar member 40. Actuation of the actuators 25 through suitable hydraulic controls (not shown) on the tractor will cause the arms 49 to raise the hook portion 49 lifting the chains 82, 83 and hence the pivoted lever or draw bar member 60 with respect to the draw bar member 40 to move the hitch between coupled and uncoupled positions. The actuators 25 may be included with the tractor frame and hence the connection to the chains may take varying forms.

The coupling section 20 of the hitch is normally applied to the draft tongue 14 of an implement such as is indicated schematically at 12 in FIGURE 1. Normally, a number of these coupling members will be provided for all implements to be connected to the tractor for draft purposes. In FIGURE 4, the coupling member 20 is shown as comprised of a flat plate 96 having an enlarged circular aperture 98 in one extremity of the same and a mounting hole 99 in the opposite extremity with a raised ribbed flange 100 around the upper edge of the plate to strengthen the same. Projecting down from the top of the plate is a curved rest member 102 which is connected at one extremity to the underside of the plate through suitable means such as welding. In addition, the underside of the plate mounts a sleeve member 106 which is suitably secured thereto such as by welding to provide a support surface for a portion of the implement tongue as to be hereinafter described. Implement tongues, such as is indicated at 14, normally include spaced plate extremities 108, 110 secured to the implement tongue through suitable means (not shown) which have apertures 112 near the extremity of the same. This provides a U-shaped or bifurcated extremity which will normally fit into or around the tongue of a tractor draw bar, such as indicated at 40. The coupling member 20 is positioned between the extremities of the tongue such that the upper surface of the plate 96 and the lower surface of the sleeve member 106 will slide in between the bifurcated extremities with the apertures 112 therein aligning with an aperture 99 in the coupling member such that a suitable pin 120 or bolt may be positioned therein and secured thereto. This will attach the coupling member 20 on the extremity of the draft tongue and provide for location of the curved rest member 102 on the undersurface of the coupling member and draft tongue to elevate the same with respect to the ground and locate the aperture 98 in the coupling member in a raised position such as to be engaged by the pin 92 and the sleeve 90 in a coupling operation as will be hereinafter described.

With the coupling member 20 in place on the draft tongues 14 of implements, such as the wagon 12, the power draft hitch permits the coupling and decoupling operation without requiring that the operator remove himself from the seat of the tractor or that he extremely accurately locate the draw bar member 40 of the tractor accurately with respect to the coupling member. The coupling operation is effected by positioning the draw bar member 60 to a lowered or downwardly pivoted position such that the pin 92 is exposed. Thereafter, the tractor operator may merely back the tractor into a position where the draw bar member 40 is in contact with or in close proximity with the end of the plate 96 of the coupling member. Through the operation of suitable control levers, the actuators 25 will be energized to raise the chains 82, 83 raising the draw bar member 60 through the bracket 86 and causing the pin 92 thereon to fit through the aperture 98 in the coupling member. Since the opening of the coupling member is extremely large relative to the upper surface of the conically shaped pin 92, the pin will readily move through the opening 98 aligning the draw bar member 60 and draw bar member 40 with the coupling member. The draw bar member 60 will be elevated until the conically shaped pin at its upper extremity is positioned in the aperture 52 of the draw bar member 40. At this point the coupling is effected and the lower or enlarged portion of the conically shaped pin will be substantially filling the aperture 98 of the coupling member. The hitch may be used in this position to draw the implement behind the tractor or, if desired, the operator may dismount and place the small pin 88 through the apertures 86 in the flanges 80 locking the draw bar members 60 and 40 together. At this point, the actuators may be lowered allowing slack in the chains 82, 83 such that pivotal movement of the draw bar members in a horizontal direction will be permitted. This will normally be used only when the implement is to be connected to the tractor for extended periods and the coupling operation together with the setting of the pin 88 will take only a few seconds time. Whenever the implement is to be decoupled from the tractor, the operation is reversed and the pin 88 is first removed after the actuators are energized. This will permit the pin to be freely removed from the apertures 86 and the brackets 80 and thereafter the actuators may be reversed in operation allowing the draw bar member 60 to move or pivot to the lower position decoupling the implement by removing the conically shaped pin 92 from the aperture 98 in the coupling member 20.

With the plurality of coupling members attached to all implements having standard draft tongues, provision is made to allow the implements to maintain the draft tongue in an elevated position such as to be readily coupled to the tractor without further positioning of the same. Further, by providing all of the implements of this type with a coupling member 20, the over-centered, unbalanced implements will not require any force or power equipment to raise the draft tongue whenever coupling of the same is desired with a tractor.

Whenever an implement not having a coupling member is to be drawn by the tractor, the end cap or sleeve 90 is removed by removal of the pin or bolt 96 therefrom allowing the sleeve with the conically shaped pin to be removed from the end of the draw bar member 60. After this, the draw member is raised to an elevated position and locked in such a position by means of the pin 88 extending through the apertures 86 in the bracket members 80. The standard bifurcated extremity of the implement tongue provided by the plates 108 on the end of a conventional draft tongue will fit between the draw bar members 40, 60 and alignment of the apertures 112 therein with the apertures 52 and 68 in the draw bar members will permit the entrance of a conventional pin to tie the coupling together. However, such an arrangement provides for accurate positioning of the implement tongue with the draw bar members 40 and 60 to effect alignment of the apertures.

This improved power draw bar hitch permits the use of any number of implements in a rapid coupling hitch type of operation without requiring accurate positioning of the tractor with respect to the implement or the removal of the operator from the tractor during the coupling operation. Further, the improved structure requires only the addition of pivoted lever chains and actuators together with a coupling member for the various implements to be used with the tractors to provide for a simplified draw bar structure which is easy to use and maintain.

What is claimed is:

1. A power draw bar hitch for a tractor having a tonguelike draw bar member attached to the tractor and pivotally mounted for movement in a horizontal plane on said yoke and with an aperture in the unpivoted end of the same comprising a second draw bar member, means pivotally mounting the second draw bar member on the tonguelike draw bar member of the tractor and spaced therefrom for pivotal movement in a plane normal to the horizontal movement of the draw bar member on the tractor, an aperture in the end of the tonguelike draw bar member, a conical shaped pin mounted in the end of the second draw bar member and projecting toward said draw bar member of the tractor, being adapted to align with the aperture in the tonguelike draw bar member when the draw bar members are in a spaced parallel relationship, power actuator means connected between the tractor and the second draw bar member for moving the same in its plane of pivotal movement toward and away from the tonguelike draw bar member of the tractor with the conical pin projecting into the aperture in the end of the tonguelike draw bar member of the tractor, a removable coupling member adapted to be connected to the tongue of an implement having aperture therein adapted to receive the conical pin on the second draw bar member and retain the same to couple the tractor to an implement, and a downwardly projecting curved member positioned on the coupling member and adapted to hold the tongue of an implement in an elevated position to receive the conical pin on the second draw bar member as it is elevated by the power actuator means, said conical pin being mounted on a cap member slidably positioned over the end of the second draw bar member and removably secured thereto.

2. The power draw bar hitch of claim 1 in which the power actuator means is a pair of hydraulic actuators mounted on the tractor and connected to the second draw bar member through a pair of chains attached to the hydraulic motors and to a U-shaped bracket secured to the underside of the second draw bar member.

3. The power draw bar hitch of claim 2 in which the connection between the pair of chains and the hydraulic motors is adjustable.

4. The power draw bar hitch of claim 1 in which the conically shaped pin is slightly higher than the distance between the tonguelike draw bar member and the second draw bar member in the elevated position so as to project through the aperture in the coupling member and into the aperture in the extremity of the tonguelike draw bar member.

5. A power draw bar hitch for a tractor having a tonguelike draw bar member attached to the tractor and pivotally mounted for movement in a horizontal plane on said yoke and with an aperture in the unpivoted end of the same comprising, a second draw bar member, means pivotally mounting the second draw bar member on the tonguelike draw bar member of the tractor and spaced therefrom for pivotal movement in a plane normal to the horizontal movement of the draw bar member on the tractor, an aperture in the end of the tonguelike draw bar member, a conical shaped pin mounted in the end of the second draw bar member and projecting toward said draw bar member of the tractor, being adapted to align with the aperture in the tonguelike draw bar member when the draw bar members are in a spaced parallel relationship, power actuator means connected between the tractor and the second draw bar member for moving the same in its plane of pivotal movement toward and away from the tonguelike draw bar member of the tractor with the conical pin projecting into the aperture in the end of the tonguelike draw bar member of the tractor, a removable coupling member adapted to connected to the tongue of an implement having aperture therein adapted to receive the conical pin on the second draw bar member and retain the same to couple the tractor to an implement, and a downwardly projecting curved member positioned on the coupling member and adapted to hold the tongue of an implement in an elevated position to receive the conical pin on the second draw bar member as it is elevated by the power actuator means, said coupling member including a channel-shaped section with apertures therein to permit connection of the same to a bifurcated extremity of an implement tongue to removably connect the coupling member to the implement tongue and in which the downwardly projecting curved member is cantilever in form and is integrally connected to the coupling member.

6. The power draw bar hitch of claim 5 in which the tractor includes thereon a quick disconnect type coupling in addition to the tonguelike draw bar member which coupling is comprised of a pair of arms with coupling extremities and connected to the power actuator means to be elevated to actuate the quick disconnect coupling and in which the power actuator means includes a pair of actuators for elevating the arms and with a chain coupling between the arms and the second draw bar member to elevate the second draw bar member relative to the tonguelike draw bar member in the operation of the power draw bar hitch.

References Cited

UNITED STATES PATENTS

| | | |
|---|---|---|
| 2,968,494 | 1/1961 | Klouda. |
| 2,983,523 | 5/1961 | Kienzle. |
| 3,022,092 | 2/1962 | Bunting et al. |

FOREIGN PATENTS 937,035   9/1963   Great Britain.

LEO FRIAGLIA, Primary Examiner

U.S. Cl. X.R.

280—490